April 3, 1951 J. R. POWER 2,547,537

TELEPHONE RINGER

Filed Dec. 22, 1948 2 Sheets-Sheet 1

INVENTOR
J. R. POWER
BY A. F. Kane
ATTORNEY

April 3, 1951 J. R. POWER 2,547,537

TELEPHONE RINGER

Filed Dec. 22, 1948 2 Sheets-Sheet 2

INVENTOR
J. R. POWER
BY A. F. Kane
ATTORNEY

Patented Apr. 3, 1951 2,547,537

UNITED STATES PATENT OFFICE 2,547,537

TELEPHONE RINGER

James R. Power, Chatham, N. J., assignor to Bell Telephone Laboratories, Incorporated, New York, N. Y., a corporation of New York Application December 22, 1948, Serial No. 66,619

6 Claims. (Cl. 177—7)

This invention relates to electromagnetically operated signaling devices and more particularly to polarized ringers of the type employed extensively at telephone substations.

Since the advent of the combined type of telephone set wherein those components of the substation which were housed previously in a separate container, or bell box, are now housed in the base of the set itself, continuous efforts have been directed to the redesign of such components with a view towards space conservation and an ultimate reduction in the size and weight of the telephone set without increasing the cost or otherwise limiting the operating capabilities of these components. The components which are now housed in the base of the telephone set include the ringer, its associated condenser and the induction coil. Of these the telephone ringer has received considerable attention in efforts to arrive at an improved design which would contribute to the attainment of the overall objective of the most economical use of available space and reduction in weight of the combined telephone set. Heretofore, however, considerable difficulty has been encountered in combining smallness of size with improved operating capabilities.

It is the object of this invention to provide an improved type of telephone ringer which is simple in design, compact in construction, small in size, inexpensive to manufacture, susceptible to straight line assembly methods and which has operating capabilities exceeding those of ringers in common use today.

This object is attained in accordance with a particular feature of the invention by the utilization of a magnetic circuit of novel configuration which lends itself to the use of a permanent magnet of diminutive size, simple pole-pieces, and a single coil-bearing laminated core, all combined to effect a small compact assembly and one which functions at maximum efficiency and high sensitivity.

Another feature of the invention resides in the use of a magnetic shunt which is constructed of magnetic iron and is supported on the ringer structure effectively in parallel relation to the coil-bearing laminated core. The action of the shunt is to increase the inductance of the ringer at both ringing and voice frequencies. This increase in inductance permits the use of a smaller condenser in the ringing circuit and also reduces the shunting effect of the ringer on voice frequency currents and has the additional desirable effect of reducing the noise currents induced in telephone systems involving grounded ringing circuits.

The shunt also affords a method of controlling the inductance to obtain other desirable effects. For example, the shunt is proportioned so that at lower ringing voltages it operates in a magnetically unsaturated condition. Under this condition the inductance of the ringer is adjusted to resonate at a ringing current frequency with a nominal value of capacity. The impedance of the ringer-condenser combination will then be a minimum and the greatest possible ringing current will be drawn from the telephone line. Also, this combined impedance is controlled by the resistance component and a minor reactive component introduced by small departures of the condenser capacity from nominal value will have little effect on the total impedance or on the operating characteristics of the ringer.

At high ringing voltages the shunt may be made to saturate magnetically. This saturation lowers the inductance and thereby throws the ringer-condenser combination off resonance at ringing current frequency. This introduces a large reactive component in the impedance of the combination which reduces the ringing current drawn from the line at high voltages.

Still another feature of the invention which contributes materially to the overall objectives of smallness of size, increased capabilities and lower cost resides in the use of a single operating coil.

A further feature of the invention contemplates a magnetic circuit arrangement comprising coil-bearing and non-coil bearing sections and in which the flux paths are such that during the interval in which the ringer produces its maximum effort, that is, when the ringer armature is being moved from its non-operated position to its operated position, the total flux in the coil-bearing core section is a minimum thus permitting the use of a smaller core which results in a saving in core material, in a saving of copper in the operating winding, and in a reduction in the overall weight and size of the ringer.

A still further feature of the invention resides in locating the armature pivot, or hinge in alignment with the polar axis of the biasing magnet thus rendering negligible the biasing effect of the magnet on the armature in that area.

These and other features of the invention will be readily understood from the following detailed description when read with reference to the accompanying drawings in which.

Figures 5, 6, 7:
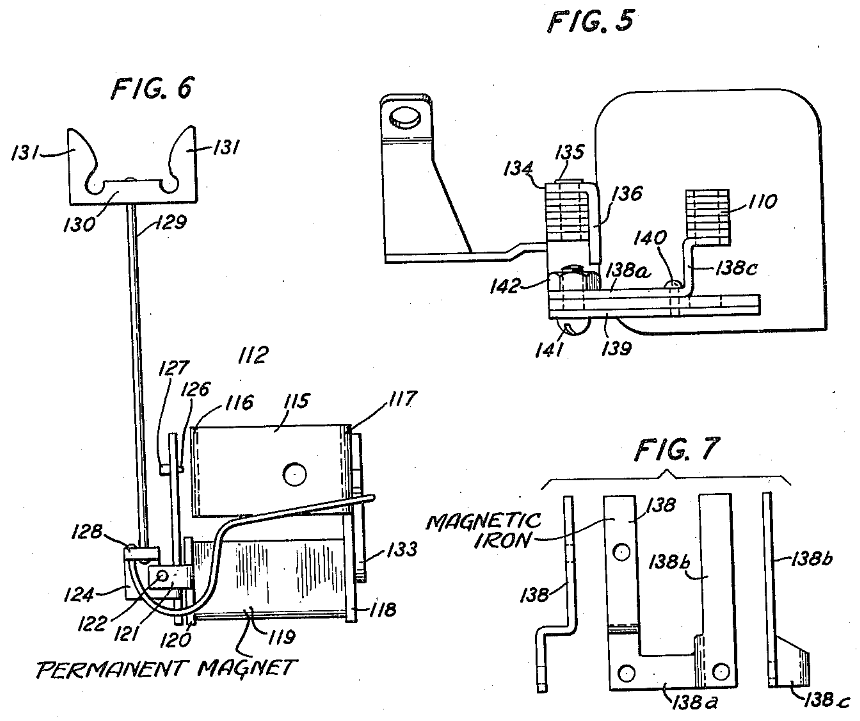
Fig. 5 is an end view of the ringer with the motor assembly removed.
Fig. 6 is a front plan view of the motor assembly.

Fig. 7 includes front and side views of the magnetic shunt; and

Figure 8:
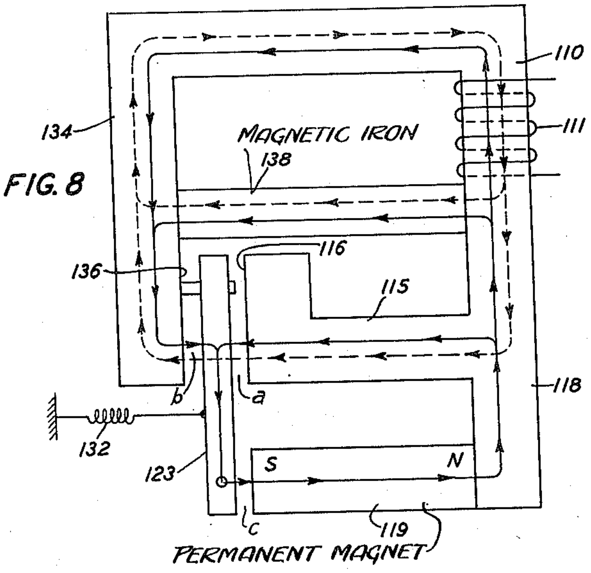

Fig. 8 is a schematic illustration of the magnetic circuit of the ringer and shows the various flux paths set up therein.

The ringer disclosed in the drawings is built around a U-shaped laminated silicon-steel core 110. A coil 111 is mounted loosely on one leg of the core, that is, on the right leg viewing Fig. 2. The use of laminated silicon steel for the core reduces the eddy current loss and thereby helps maintain a high inductance at voice frequencies.

A motor assembly 112, shown particularly in Fig. 6 is secured to the lower end of the right leg of core 110 by means of a screw 113 which passes through suitable holes in the core laminations and accommodates a suitable nut, not shown. The motor assembly includes a U-shaped magnetic iron pole-piece 115 having two inwardly (Fig. 2) projecting legs 116 and 117, the latter of which projects downwardly to effect an extension 118. The leg 116 of this pole-piece forms the pole face of one of the operating magnetic gaps. To the leg extension 118 there is fixed, preferably by welding, a small bar-type permanent magnet 119 of substantially square section. Modern magnetic alloys of high coercive force make feasible the use of a very short magnet located as described. A magnetic iron yoke 120 is fixed to the other end of the magnet 119, preferably by welding and is characterized by two bent-over, oppositely disposed arms 121 which are provided with suitable coaxial holes to accommodate, by a drive fit, a pivot pin 122.

A substantially rectangularly-shaped armature 123 is provided with integral bent-over sections 124 and 125 having suitable holes which accommodate the pivot pin 122 in a manner to permit the armature to rotate freely about the pin. Two stops 126 and 127 (Fig. 6) are riveted to the armature near its outer end. These stops limit the motion of the armature by striking the pole faces 116 and 136, respectively. The location of the operating gaps close to the end of the magnet results in a minimum magnetic leakage and thereby reduces the required size of the magnet.

An integral arm 128 formed on the armature extension 124 serves to support a clapper rod 129 which is staked therein. A yoke-shaped clapper 130 is staked to the other end of the clapper rod. Two projections 131 of this yoke are disposed to strike the inside surfaces of gongs 149, an arrangement which permits a closer mounting of the gongs than is possible with the usual type of clapper and which therefore results in a reduction in the overall size of the ringer.

A biasing spring 132 is also staked to the turned-up portion 128 of the armature, the free end of which may be selectively engaged in one of several notches in the edge of a plate 133 fastened to section 117 of pole-piece 115. The biasing spring is so shaped that when engaged in any of the notches it will exert a force on the armature tending to hold the stop 127 against pole face 136. The magnitude of this force is adjustable by the selection of the notch in which the spring is engaged.

A second magnetic iron pole-piece 134 is fastened to the exposed leg of core 110 by means of rivets 135. A bent-down section of this pole-piece forms the pole face 136 (mentioned hereinbefore) of the operating magnetic gap.

The space between the pole faces 116 and 136 is adjusted to provide the desired air-gap in the magnetic circuit. The armature 123 normally is positioned in this gap by the stop 127 which is forced against the pole face 136 by the tension of the biasing spring 132. The length of the stop 127 is such as to hold the armature substantially in the magnetic neutral of the gap when there is no current flowing in the operating coil 111. The length of the other stop 126 is designed to limit the movement of the armature to a predetermined extent. Pole face 116 is slightly skewed so that it is parallel to the armature in the operated position, that is when stop 126 is in contact with pole face 116.

Figures 1, 2, 3, 4:
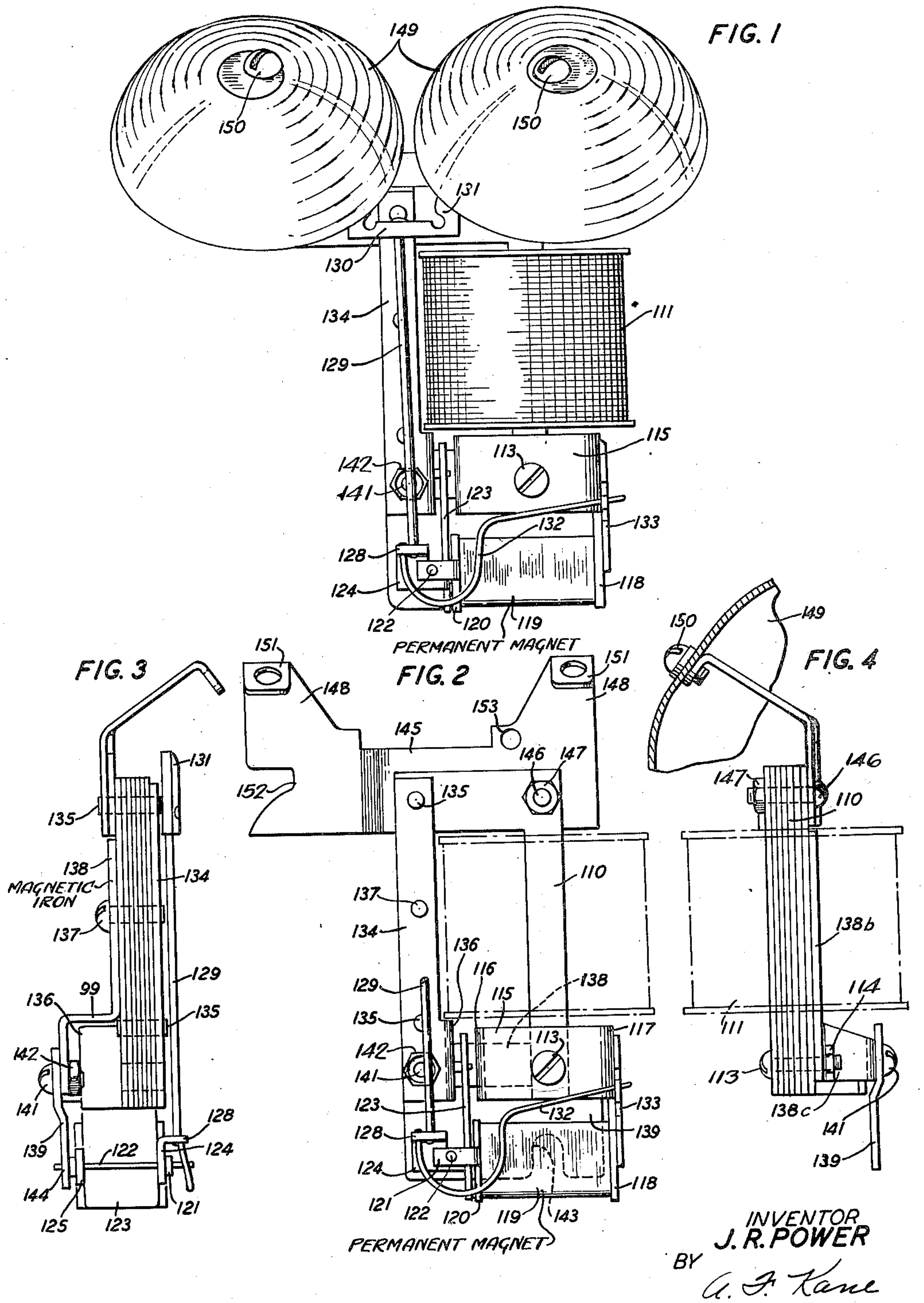
Fig. 1 is a front plan view of the ringer embodying the features of the invention.
Fig. 2 is a front plan view of the ringer shown in Fig. 1, with the gongs removed and the coil indicated in outline in order to show in greater detail the frame, core and other structural details.
Fig. 3 is a side elevation of the ringer structure illustrated in Fig. 2 and shows the relation of the frame, core structure, one leg of the magnetic shunt and motor assembly.
Fig. 4 is another side elevation of the ringer showing the frame, the part of the core structure which passes through the ringer coil and the other leg of the magnetic shunt.

A U-shaped magnetic shunt 138 (Fig. 7) of magnetic iron is secured to the outer leg of core 110 by means of a screw 137 which passes through suitable holes in the shunt and in the core laminations and is screwed into the pole-piece 134. The end of the other opposite leg of the shunt is held in contiguous engagement with the bottom of the inner leg of the core by means of a screw 113 and a nut 114 which also secure the pole-piece 115 to the core. A section of the shunt 138 is fashioned at 99 (Fig. 3) so as to clear the pole faces 116 and 136. The cross-section of this shunt is proportioned so that it will become magnetically saturated at a predetermined value of ringing current as will be described in detail hereinafter. In Figs. 2, 3 and 4 the several integral sections of the shunt are designated 138, 138*a*, 138*b* and 138*c*. These designations are also employed in Fig. 7.

A mounting bracket 139 is secured to section 138*a* of the magnetic shunt by means of a rivet 140 (Fig. 5) and a screw 141 and its associated nut 142. This bracket has a notch 143 in its outer edge designed to engage a resiliently-mounted stud (not shown) in the base of a telephone set. The bracket 139 also has a hole 144 through which the left end (viewing Fig. 3) of pivot pin 122 projects. This latter aids in locating the motor assembly 112 and prevents rotational displacement about the screw 113. A mounting bracket 145 is secured to the closed end of the core 110 by means of a rivet 135 and a screw 146 and its nut 147. Two upwardly extending arms 148 of the bracket 145 provide supports for gongs 149. The axes of the gongs are held at an angle of approximately 45 degrees with respect to the plane of the core 110 and to the clapper rod 129. This angle results in a more compact arrangement than would be possible if the axes of the gongs were parallel to the clapper rod. The gongs are secured to the bracket arms 148 by means of screws 150 which pass through eccentrically-located holes in the gongs and are threaded or screwed into suitably tapped holes in bracket extensions 151. The position of the rim of each gong relative to the clapper 130 is adjustable by rotation of the gong about its eccentrically-located mounting hole. The bracket 145 is also provided with a notch 152 for engagement with another stud (not shown) in the base of the telephone set and with a threaded hole 153 to receive a screw that passes through an eyelet (not shown) in the base of the set. The ringer is thus held in place by means of the two notches 143 and 152 and the screw that fits into the hole 153.

Fig. 8 illustrates, diagrammatically, the magnet flux paths in the magnetic system embodied in the ringer of this invention. The biasing flux path, that is, the path traversed by the flux set up by the permanent magnet 119 is represented by continuous lines while the path of the flux set up by the ringing current is represented by a broken line. The arrowheads on the continuous lines indicate the direction of the biasing flux in the circuit at all times while the arrowheads on the broken lines indicate the direction of the ringing current flux during one-half cycle of current, it being understood that the flux direction in the latter case is reversed every half cycle. The magnetic shunt in this figure is represented, for simplicity, by a straight bar interconnecting the opposite legs of the ringer core.

The permanent magnet flux emanating from the north pole N of the permanent magnet 119 enters section 118 of the pole-piece 115 and on leaving it, traverses three parallel branches one of which includes section 115, air-gap $a$, armature 123 and back to the south pole S of the magnet 119 by way of air-gap $c$; another by way of the magnetic iron shunt 138, air-gap $b$, armature 123 and thence back to the permanent magnet 119 by way of air-gap $c$; and a third path which includes the core 110 in place of the shunt 138 in the second path traced.

When the armature 123 is near the center of the air-gap in which it operates the total effect of the biasing fluxes in gaps $a$ and $b$ is small since they are substantially equal in magnitude and directionally opposed relative to their effect on the armature. The flux in gap $b$ tends to pull the armature 123 towards the pole 136 while the flux in gap $a$ tends to pull the armature towards the other pole 116. Hence, in so far as the biasing flux in gaps $a$ and $b$ is concerned the armature 123 is substantially balanced. The pivot point about which armature 123 is adapted to rotate is, in accordance with a particular feature of the invention, intentionally located in alignment with the polar axis of the permanent magnet 119 in order that the magnetic force in gap $c$ will not contribute materially to the magnetic bias.

When ringing current traverses the coil 111 the first half cycle causes flux to flow downward in the core 110 whence it divides, part of it being additive to the biasing flux in shunt 138 and another part being additive to the biasing flux in section 115 and air-gap $a$, and opposed to the biasing flux in air-gap $b$ and the other leg of the core. Under this condition the total flux in gap $a$ predominates to an extent such that the unbalance in the magnetic forces overcomes the force of the biasing spring 132. The armature then moves clockwise about its pivot. As the armature moves, the length of gap $a$ decreases and that of gap $b$ increases causing a redistribution of the polarizing flux such that the force of gap $a$ due to the polarizing flux increases and the force in gap $b$ due to the polarizing flux decreases. The armature 123 thus moves until the stop 126 engages the pole face 116 and the clapper 131 strikes one of the gongs 149. On the other half cycle of ringing current the described conditions of the flux due to the ringing current are reversed and the ringing current flux is additive to the polarizing flux in gap $b$ and opposes it in gap $a$. The change in total flux caused by this half cycle of ringing current thus assists the biasing spring 132 in moving the armature 123 in a counter-clockwise direction, that is, from its operated position in which the stop 126 contacts pole face 116 to its non-operated position in which the stop 127 contacts pole face 136. The overthrow of the clapper rod on this return movement of the armature results in the actuation of the other gong 149.

It will be noted that during the first half cycle of ringing current which results in armature 123 being moved out of its non-operated position, the ringing current flux in the core 110 is directively opposed to the polarizing flux therein so that the total flux in the coil-bearing core section 110 is less than the ringing current flux. Of course, during the next half cycle the ringing current flux and the biasing flux are additive and the total flux in this portion of the core is greater than the ringing current flux, but, as will be described presently the magnetic action during the first half cycle of ringing current is of relatively greater importance.

The ringer of this invention is arranged so that as the armature 123 moves from its non-operated position to its operated position energy is stored in biasing spring 132. When the ringing current falls to zero the energy in the biasing spring is sufficient to return the armature to its non-operated position and to cause one of the gongs 149 to be struck by the clapper 130. Obviously, current flowing in the opposite direction also will tend to move the armature from its operated position to its non-operated position but the restoration of the armature is not dependent upon current flow. Thus it is apparent, particularly at current values near the minimum capable of operating the ringer that the basic problem involved in the design of the magnetic system of a telephone ringer is embodied in the movement of the armature out of its non-operated position, the reverse motion of the armature being achieved substantially mechanically.

With the arrangement employed in the present ringer in which the biasing flux cancels a significant part of the ringing current flux in the core section 110 during the half cycles of ringing current associated with the movement of the armature from its non-operated position to its operated position there is a relatively small amount of flux flowing through the core during the time when it is desired that the ringing current exert the greatest force upon the armature. This smaller quantity of flux which flows through the core when the ringer produces its maximum effort permits the use of a smaller core with an attendant saving in core material and in copper in the operating winding, and results in a reduction in the overall weight and size of the ringer. Also this reduction in flux reduces the loss of magnetomotive force at the contacting surfaces between the core ends and the pole-pieces. This is desirable as it relaxes the requirements on the reluctance of these contact areas.

While it is apparent that the combination of fluxes in those sections of the magnetic circuit external to the coil-bearing core section is the converse of that in the coil-bearing section and that, therefore, during the above-indicated half cycles of ringing current, the total flux will exceed the ringing current flux thus suggesting a necessary increase in the amount of material in these sections, it is to be observed that none of these sections is located within the coil and, therefore, can be made as large as necessary without having the effect upon the size and cost of the ringer that would result from the enlargement of the coil-bearing core section 110.

What is claimed is:

1. A telephone ringer comprising, in combination, a U-shaped laminated core, a coil mounted on one of the opposed legs of said core, a pole-piece of magnetic iron fixed to each opposed core leg near its end to effect an air-gap, a pivotally-mounted armature disposed for operation in said air-gap, and a straight bar-type permanent magnet having its polar and longitudinal axes coincident, said magnet having one end in fixed abutting relation to one of said pole-pieces and projecting therefrom in a direction such that the pivot mounting for said armature is located on the polar axis of said magnet.

2. In a telephone ringer, a laminated U-shaped core, a coil mounted on one of the opposed legs of said core, pole-pieces fixed to the ends of said core legs effecting an air-gap, an armature disposed in said air-gap for operation therein incident to the energization of said coil by alternating current, mechanical means for biasing said armature in the direction of one of said pole-pieces, a straight bar-type permanent magnet disposed relative to said core and said pole-pieces so that when said coil is traversed by half cycles of current which cause said armature to move in the direction of the other of said pole-pieces the flux in the coil-mounting leg of said core produced by the said half cycles of current is directively opposed by flux set up in the said coil-mounting core leg by said permanent magnet, and means mounting said armature for pivotal movement about a line coincident with the polar and longitudinal axes of said magnet.

3. In a telephone ringer, a laminated U-shaped core, a coil mounted on one of the opposed legs of said core, a pole-piece fixed to each opposed leg of said core to effect an air-gap therebetween, a straight bar-type permanent magnet fixed at one end to an extension of one of said pole-pieces with its polar and longitudinal axes coincident and at right angles to the longitudinal axes of the opposed core legs, a pivot pin supported by the other end of said permanent magnet and located in the plane of the polar axis thereof, and an armature mounted on said pivot pin for oscillatory movement in said air-gap.

4. In a telephone ringer, a laminated U-shaped core, a coil mounted on one of the opposed legs of said core, a pole-piece fixed to the end of each opposed leg of said core and effecting an air-gap therebetween, a bar-type permanent magnet fixed at one end to one of said pole-pieces with its polar axis at right angles to the longitudinal axes of said core legs, an armature supported on the other end of said permanent magnet for pivotal movement about the polar axis thereof and for oscillation in said air-gap, and a shunt of magnetic iron coupling the ends of the opposed legs of said core.

5. In a telephone ringer, a U-shaped core, pole-pieces fixed to the ends of said core to effect an air-gap, a straight bar-type permanent magnet for producing a biasing flux in said air-gap having its polar and longitudinal axes coincident, an armature having but one end disposed in said air-gap and the other end in spaced relation to one end of said permanent magnet, whereby said armature and the spacing between the armature and permanent magnet provide a return path for the biasing flux traversing the said air-gap, and means for mounting said armature for pivotal movement about the polar axis of said permanent magnet whereby the biasing effect of the flux traversing the spacing between the armature and the permanent magnet is substantially nil.

6. In a telephone ringer, a magnetic circuit including a core comprising U-shaped silicon-steel laminations, a soft iron pole-piece fixed to one of the opposed legs of said core and having a downturned integral portion effecting a pole face, a U-shaped soft iron pole-piece fixed at the end of the other of the opposed legs of said core, one of the opposite legs of which effects a second pole face located in juxtaposition to the other pole face, and the other leg of which is extended in a plane parallel to the plane of said core, a substantially U-shaped shunt of magnetic iron having each of its two opposed legs in contiguous relation to a different one of the two opposed legs of said core and its bridging piece disposed between the ends thereof, a bar-type permanent magnet fixed at one end to the extended leg of said U-shaped pole-piece and projecting therefrom at right angles in the direction of the air-gap effected by the pole faces of said pole-pieces, a plate fixed to the other end of said permanent magnet and having a pair of oppositely disposed projections located in the plane of the polar axis of said permanent magnet, a mounting pin supported between said plate projections, and an armature mounted for rotation on said pin and extending therefrom into the air-gap effected by the pole faces of said pole-pieces.

JAMES R. POWER.

REFERENCES CITED

The following references are of record in the file of this patent:

UNITED STATES PATENTS

| Number | Name | Date |
|---|---|---|
| 548,416 | Scribner | June 15, 1897 |
| 1,048,913 | Stuart et al. | Dec. 31, 1912 |
| 1,901,443 | Garvin | Mar. 14, 1933 |
| 2,412,610 | Gent | Dec. 17, 1946 |